(12) United States Patent
Chang et al.

(10) Patent No.: US 9,197,926 B2
(45) Date of Patent: Nov. 24, 2015

(54) LOCATION BASED DETERMINATION OF RELATED CONTENT

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/910,390

(22) Filed: Jun. 5, 2013

(65) Prior Publication Data

US 2014/0366074 A1 Dec. 11, 2014

(51) Int. Cl.
*H04N 21/435* (2011.01)
*H04N 21/44* (2011.01)
*H04N 21/2362* (2011.01)
*H04N 21/41* (2011.01)
*H04N 21/81* (2011.01)
*H04N 21/8547* (2011.01)
*H04N 21/858* (2011.01)

(52) U.S. Cl.
CPC ......... *H04N 21/435* (2013.01); *H04N 21/2362* (2013.01); *H04N 21/4126* (2013.01); *H04N 21/8133* (2013.01); *H04N 21/858* (2013.01); *H04N 21/8547* (2013.01); *H04N 21/44008* (2013.01)

(58) Field of Classification Search
None
See application file for complete search history.

(56) References Cited

U.S. PATENT DOCUMENTS

| 7,911,497 | B2 | 3/2011 | Russell et al. |
| 8,126,308 | B2 | 2/2012 | Shibata et al. |
| 8,190,605 | B2 | 5/2012 | Kuhlke et al. |
| 8,338,685 | B2 | 12/2012 | Bonet et al. |
| 2004/0177370 | A1 | 9/2004 | Dudkiewicz |
| 2007/0038950 | A1* | 2/2007 | Taniguchi et al. ............ 715/768 |
| 2008/0065697 | A1 | 3/2008 | Moriya et al. |
| 2008/0307311 | A1* | 12/2008 | Eyal .............................. 715/733 |
| 2010/0115012 | A1* | 5/2010 | Yip et al. ...................... 707/899 |
| 2010/0262599 | A1* | 10/2010 | Nitz .............................. 707/723 |
| 2011/0145880 | A1 | 6/2011 | Wang |
| 2012/0311074 | A1 | 12/2012 | Arini et al. |
| 2013/0014155 | A1* | 1/2013 | Clarke et al. .................... 725/32 |

FOREIGN PATENT DOCUMENTS

WO 2011091190 A3 7/2011
WO 2011103258 A3 8/2011

OTHER PUBLICATIONS

"Apple is granted a Sweet Cable TV Set-Top-Box Patent & More"; Patently Apple; Jan. 4, 2011; Printed Mar. 4, 2013; <http://www.patentlyapple.com/patently-apple/2011/01/apple-is-granted-a-sweet-cable-tv-set-top-box-patent-more.html>.
"IPTC Core & Extension = the IPTC Photo Metadata standard"; IPTC; Printed Mar. 4, 2013; <http://www.iptc.org/sms/site/index.html?channel=CH0099>.
"Kinomap"; Wikipedia; Printed Mar. 4, 2013; <http://en.wikipedia.org/wiki/Kinomap>.

* cited by examiner

*Primary Examiner* — Idriss N Alrobaye
*Assistant Examiner* — Dayton Lewis-Taylor
(74) *Attorney, Agent, or Firm* — Edward J. Wixted, III; Nicholas Cadmus

(57) ABSTRACT

In a method for determining other content related to location information of program content displayed on a device, one or more processors receive one or more portions of a first content displayed on a first device. One or more processors determine location information of the one or more portions. One or more processors determine a second content based, at least in part, on the location information. One or more processors cause the determined second content to be displayed.

20 Claims, 5 Drawing Sheets

LOCATION BASED DETERMINATION OF RELATED CONTENT

FIELD OF THE INVENTION

The present invention relates generally to viewable content, and more particularly to determining other content available related to location information of viewable content.

BACKGROUND OF THE INVENTION

Video viewers have more options than ever before. Videos may be viewed from non-traditional devices such as computers, mobile devices such as laptops, smart phones, tablets, etc. New business models are dedicated to providing viewers with options to watch favorite cable television shows and movies on the internet. These models provide viewers with an option to rate programs, and new programs are suggested based on viewers' ratings and viewing history.

Video metadata, which commonly includes time stamps and detailed information about the video, and may reflect meaningful information about aspects of the video such as its production, its editing, its content, its authors, its distribution, and so on. Typical video metadata provides data from technical information, such as camera aperture, frame rate, etc., to information about the scene, the take number, etc. Video metadata allows the editor to easily locate and identify scenes within a video and more detailed metadata such as transcripts, tags, titles, and keywords assist viewers in finding a video on the internet.

SUMMARY

Aspects of an embodiment of the present invention disclose a method, computer program product, and system for determining other content related to location information of program content displayed on a device. One or more processors receive one or more portions of a first content displayed on a first device. One or more processors determine location information of the one or more portions. One or more processors determine a second content based, at least in part, on the location information. One or more processors cause the determined second content to be displayed.

DETAILED DESCRIPTION

Figure 1:
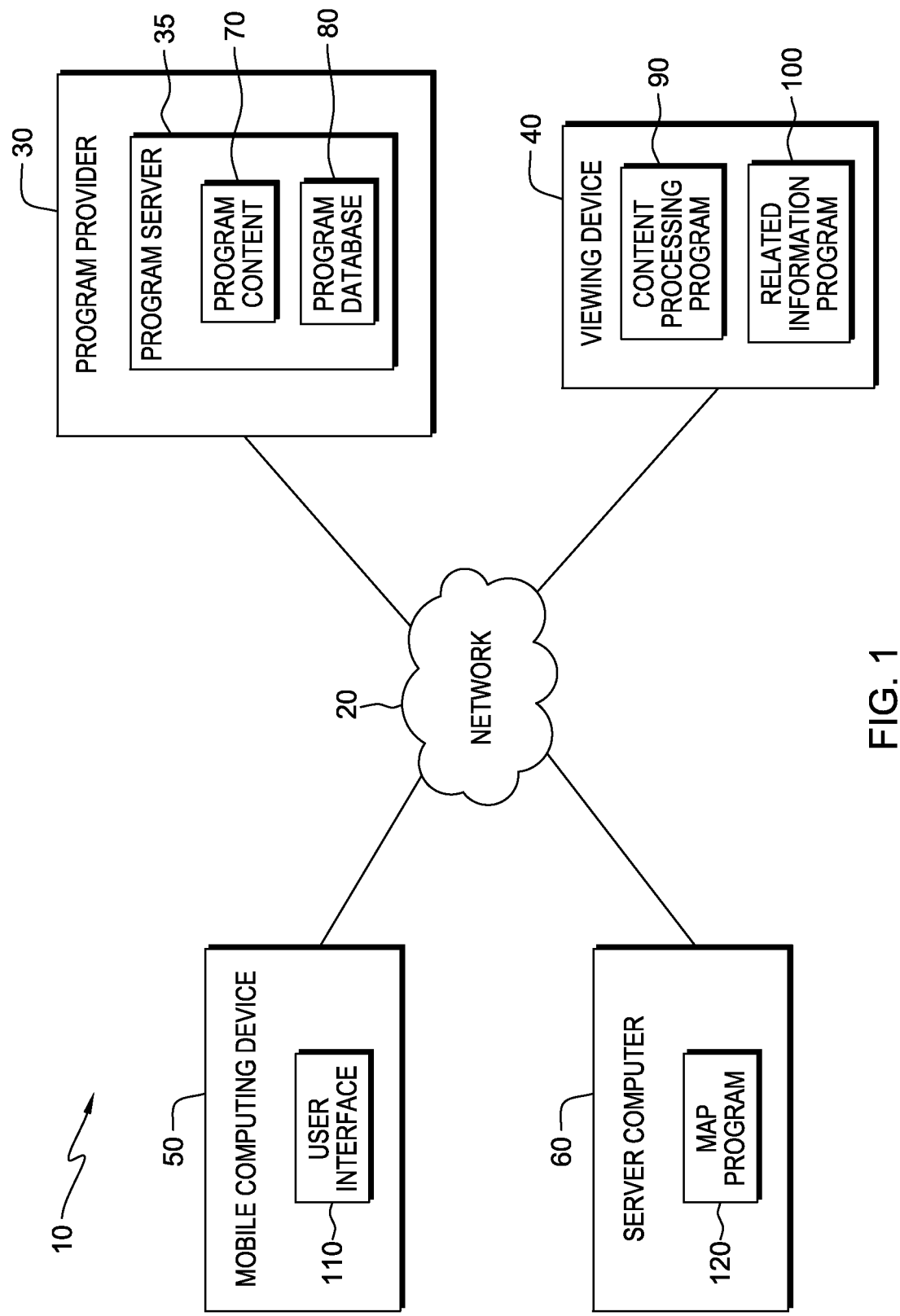
FIG. 1 is a functional block diagram illustrating a distributed data processing environment, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. The term "computer-readable hardware storage device" does not encompass signal propagation media such as copper cables, optical fibers, and wireless transmission media.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

In the depicted embodiment, distributed data processing environment 10 includes program provider 30, program server 35, viewing device 40, mobile computing device 50, and server computer 60 interconnected over network 20. Network 20 may be a local area network (LAN), a wide area network (WAN) such as the Internet, a cable television system, a satellite television system, an "over the air" system, a combination thereof, or any combination of connections and protocols that will support communications between program server 35, viewing device 40, mobile computing device 50, and server computer 60, in accordance with embodiments of the invention. Network 20 may include wired, wireless, and/or fiber optic connections. Distributed data processing environment 10 may include additional server computers, mobile computing devices, program providers, or other devices (not shown).

Program provider 30 (e.g., a cable system, satellite system, the Internet, or an "over the air" television station) distributes program content intended for viewers. In this embodiment, program provider 30 delivers program content using only program server 35 for delivering program content. Alternatively, program provider 30 may include multiple devices, which may be widely distributed.

Program server 35 is a management server. Alternatively, program server 35 may be a web server, or any other electronic device or computing system capable of receiving and sending data. In other embodiments, program server 35 may represent a server computing system utilizing multiple computers as a server system, such as in a cloud computing environment. Program server 35 contains program content 70 and program database 80. Program server 35 also contains software (not separately shown in FIG. 1) capable of sending program content 70 to viewing device 40.

Program content 70 may be a movie, sporting event, television episode, picture, or sound. In this embodiment, program content 70 is intended for wide distribution, but this is not necessarily true for the content in all embodiments of the present invention. In this embodiment, program content 70 is a file of digital content which includes audio and video data. Alternatively, program content 70 could be streaming data from a live broadcast. In this embodiment, program content 70 is located on provider server 35. In another embodiment, program content 70 may be located on another electronic device or computing system, provided that program content 70 is accessible to the software on provider server 35 that is capable of sending program content 70 to viewing device 40.

In this embodiment, program content 70 also includes metadata (not separately shown in FIG. 1). This metadata may contain location information for program content 70. Location information is hereby defined as any geographical information related to the content of a video or audio portion. Examples of location information include, but are not limited to the location of the video or audio recording, locations related to people (for example, birthplaces) shown in a video recording, locations related to objects (for example, museum pieces) shown in a video, a location where a video was edited, a real life location corresponding to an audio recording of a fictional audio recording, and locations discussed in a video of a geography lecture. Location information metadata is hereby defined as any location that is present in the form of metadata contained in the audio-visual presentation file to which the location information relates. Time-correlated location information metadata is any location information metadata that is correlated to specific portion(s) in the running time of its associated audio-visual presentation. The location information may at least identify a geographic location where program content 70 was filmed. The location information may include global positioning system (GPS) coordinates, geographic location name (e.g., city, state, country, etc.), or any other means to identify a geographic location.

In this embodiment, program content 70 has one or more portions. If program content 70 has more than one portion the metadata will contain location information for each portion of program content 70. The metadata may be embedded at the beginning of program content 70 and may contain the location information for the one or more portions. Alternatively, the metadata may be embedded at the beginning of each portion throughout program content 70.

Program database 80 is a repository that may be written and read by software on program server 35 and may be accessible to related information program 100. For example program database 80 may be a database. In this embodiment, program database 80 is located on program server 35. Alternatively, program database 80 may be located on another system or another computing device, provided that program database 80 is accessible to related information program 100. Program database 80 contains a list of other content available from program provider 30 and corresponding location information identifying where the other content was filmed. For example, other content available may take various forms including, but not limited to, the following: programs that contain similar location information (for example programs that were filmed at the same location), images of the geographic location, facts about the geographic location (for example trivia), advertisements, and weather information about the geographic location. In this embodiment, the user may customize related information program 100 to display other content based on the user's preferences.

Viewing device 40 is a set-top box connected to a television. Alternatively, viewing device 40 may be a desktop computer, a television, or a mobile computing device such as a smart phone, tablet computer, or personal digital assistant (PDA). Viewing device 40 may be any device that can send and receive data, and that can communicate with program server 35, mobile computing device 50, and server computer 60 over network 20. Viewing device 40 includes content processing program 90 and related information program 100.

Content processing program 90 operates to receive program content 70 in the form of a source signal, from program server 35, and convert the source signal into a form that can then be displayed on viewing device 40. For example, content processing program 90 may be a commercially available set-top box control program. In this embodiment, content processing program 90 resides on viewing device 40. Alternatively, content processing program 90 may reside on another electronic device or computing system, provided that content processing program 90 can communicate with software on program server 35.

Mobile computing device 50 is a smart phone. Alternatively, mobile computing device 50 may be a tablet computer, laptop computer, or personal digital assistant (PDA). In general, mobile computing device 50 may be any electronic device or computing system capable of sending and receiving data, and communicating with viewing device 40 over network 20. Mobile computing device 50 includes user interface 110. In other embodiments, mobile computing device 50 may not even be mobile such as a desktop computer.

User interface (UI) 110 operates on mobile computing device 50 to visualize content, such as menus and icons, and to allow a user to interact with an application accessible to mobile computing device 50. In this embodiment, UI 110 comprises an interface to a client program (not shown) of related information program 100. For example, UI 110 may display data received by the client program from related information program 100 and send input to the client program of related information program 100. Alternatively, UI 110 may comprise one or more interfaces such as, an operating system interface and/or application interfaces.

Server computer 60 may be a management server, web server, or any other electronic device or computing system capable of receiving and sending data. Alternatively, server computer 60 may represent a server computing system utilizing multiple computers as a server system, such as in a cloud computing environment. Server computer 60 contains map program 120.

Map program 120 operates to determine a geographic location on a map based on location information from related information program 100. In this embodiment, map program 120 is a known web mapping service application that uses geographic coordinates or location names to determine a geographic location on a map. For example, Google® Maps is a known web mapping service application that may be accessed through an application programming interface (API). Alternatively, map program 120 may also indicate points of interest that are within a specific radius of the location information based on the user's customized preferences. For example, map program 120 may indicate the locations restaurants within a 10 mile radius of the location information.

Related information program 100 operates to determine, during a period when program content 70 is displayed on viewing device 40, other content available related to the location information for program content 70. In this embodiment, related information program 100 receives program content 70. Related information program 100 determines the location information of program content 70. Related information program 100 determines other content available based on the location information of program content 70. Related information program 100 causes the other content available to be displayed.

Related information program 100 may also operate to determine one or more geographic locations on a map based on the location information of program content 70. Related information program 100 then causes the determined geographic location(s) on a map to be displayed.

In this embodiment, related information program 100 resides on viewing device 40. Alternatively, related information program 100 may reside on another electronic device or computing system, provided that related information program 100 is able to communicate with content processing program 90 and has access to program database 80.

Figure 2:
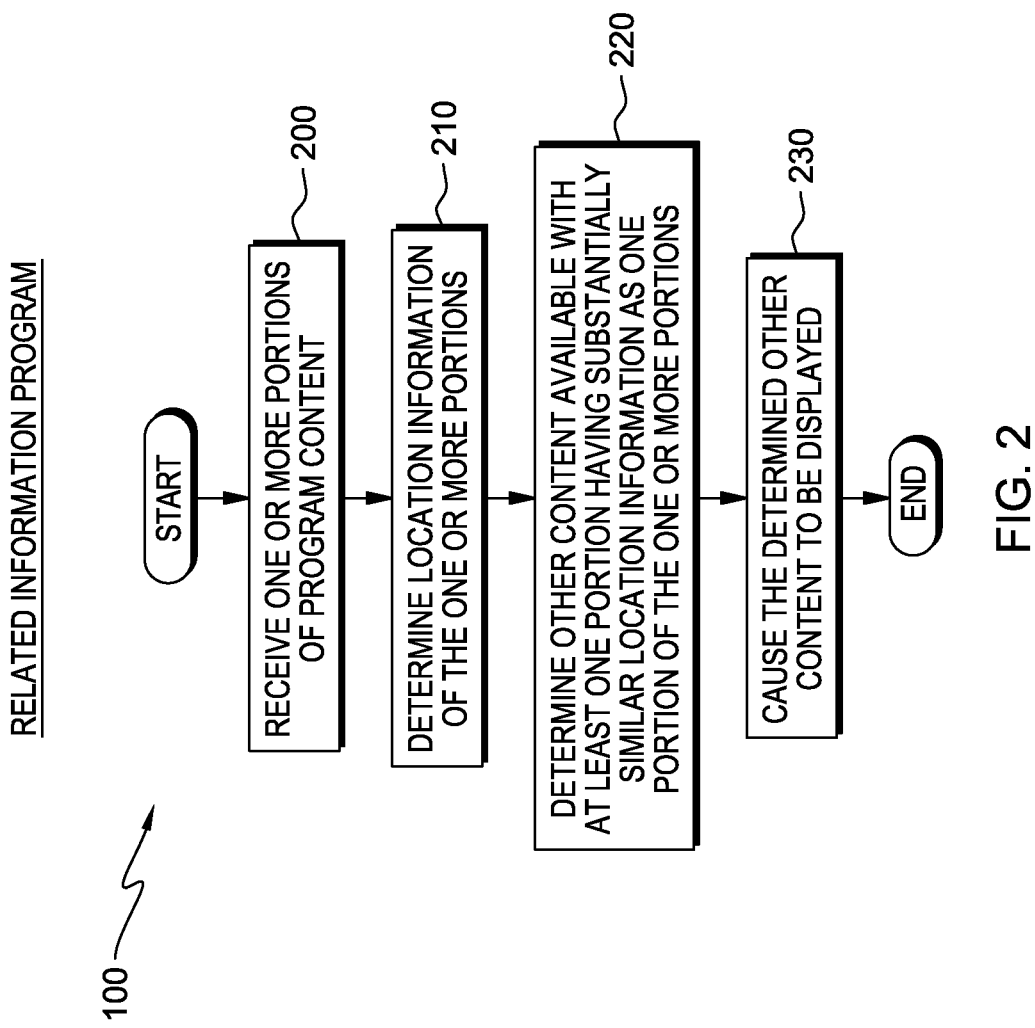
FIG. 2 is a flowchart depicting operational steps of a related information program, executing within the distributed data processing environment of FIG. 1, for determining, during a period when program content is displayed on a viewing device, other content available related to location information of the program content, in accordance with one embodiment of the present invention.

FIG. 2 is a flowchart of the steps of related information program 100, operating on viewing device 40, for determining, during a period when program content 70 is displayed on viewing device 40, other content available related to the location information for program content 70, in accordance with one embodiment of the present invention.

In this embodiment, initially, a user at viewing device 40 using content processing program 90 selects program content 70 to be displayed on viewing device 40. The software on program sever 35 continuously streams program content 70 to content processing program 90. For example, program provider 30 is a cable provider that uses software on program server 35 to continuously stream program content 70 to viewing device 40. Alternatively, a user at viewing device 40 uses content processing program 90 to send a request to the software on program server 35 to send program content 70 to content processing program 90 for display on viewing device 40. The software on program server 35 sends program content 70 to content processing program 90. For example, program provider 30 is an internet over-the-top subscription service, such as Hulu® or Netflix®.

In this embodiment, content processing program 90 sends received program content 70 to related information program 100 when program content 70 is to be displayed on viewing device 40. In another embodiment, related information program 100 intercepts program content 70 sent from the software on program server 35 to content processing program 90 when program content 70 is to be displayed on viewing device 40.

In step 200, related information program 100 receives one or more portions of program content 70. In this embodiment, related information program 100 receives the one or more portions of program content 70 from content processing program 90. Alternatively, related information program 100 intercepts the one or more portions of program content 70 sent from the software on program server 35 to content processing program 90 before passing the one or more portions of program content 70 to content processing program 90.

In this embodiment, related information program 100 receives the one or more portions of program content 70 as streaming data as each portion of the one or more portions of program content 70 is displayed on viewing device 40. Alternatively, related information program 100 receives the one or more portions of program content 70 as a single file at any time one of the one or more portions of program content 70 is displayed on viewing device 40.

In step 210, related information program 100 determines location information of the one or more portions of program content 70. In this embodiment, related information program 100 reads the metadata for each of the one or more portions of program content 70 to determine the location information for each portion as each portion of the one or more portions is displayed on viewing device 40. Alternatively, related information program 100 reads the metadata for all of the one or more portions of program content 70 to determine the location information for all portions at any time one of the one or more portions of program content 70 is displayed on viewing device 40.

In this embodiment, the metadata contains the location information for each portion. In another embodiment, the metadata contains location information for the entire program content. The location information may be a geographic location where a portion of program content was filmed. The geographic location may be in the form of the name of the geographic location name where the portion was filmed. For example, a geographic location name may be Rome, Italy. Alternatively, the geographic location may be in the form of GPS coordinates of the location where the portion was filmed.

In step 220, related information program 100 determines other content available with at least one portion having substantially similar location information as one portion of the one or more portions of program content 70. Alternatively, related information 100 determines other content available with one or more portions, each having substantially similar location information as a respective portion of program content 70. Location information does not have to match exactly. For example, location information for one portion of the one or more portions of program content 70 may be a geographic location name such as Rome, Italy. Location information for the at least one portion of other content may be GPS coordinates that indicate Rome, Italy. Also, if two sets of GPS coordinates are being compared there could be a preset distance within witch they would be considered substantially similar.

Depending on how the location information is determined in step 210, related information program 100 may determine the other content available in different ways. In this embodiment, for example, if the location information for each portion of the one or more portions of program content 70 is determined in real-time as each portion is displayed on viewing device 40, related information program 100 determines other content available with at least one portion having substantially similar location information to the portion of the one or more portions of program content 70 currently displayed on viewing device 40. Alternatively, for example, if the location information for all portions of the one or more portions of program content 70 are determined at any time one of the one or more portions of program content 70 is displayed on viewing device 40, related information program 100 determines other content available with at least one portion having substantially similar location information to any portion of the one or more portions of program content 70.

In this embodiment, related information program 100 accesses program database 80 in order to compare location information of other content available from content provider 30 to the location information of the one or more portions of program content 70. Related information program 100 creates a list of other content with at least one portion having substantially similar location information as the one portion of the one or more portions of program content 70.

Alternatively, related information program 100 searches the Internet in order to determine other content with at least one portion having substantially similar location information as one portion of the one or more portions of program content 70.

In step 230, related information program 100 causes the determined other content to be displayed. In this embodiment, related information program 100 causes a list of the determined other content to be displayed on mobile computing device 50. For example, the list may be sent to a client program (on mobile computing device 50—not shown) of related information program 100 over network 20 from related information program 100. The client program sends the list to UI 110 to be displayed to a user at mobile computing device 50. Alternatively, related information program 100 causes the determined other content to be displayed on viewing device 40. For example, the list may be sent to content processing program 90 from related information program 100. Content processing program 90 displays the list of determined other content. In various other embodiments, the determined other content may be displayed in a selectable menu, a pop-up window, or any other form so as to display the determined other content.

Alternatively, the user at mobile computing device 50 using UI 110 may select other content to view from the list of determined other content. UI 110 receives the selection of other content to view and sends the selection to the client program of related information program 100. The client program of related information program 100 sends an indication of the selection to related information program 100 over network 20. Related information program 100 sends the indication of the selection of other content to view to the software on program server 80. The indication may contain a preference to where the selected other content to view should be sent. This preference would be selected by the user who chose the other content to view. For example, the other content may be sent to viewing device 40 or to mobile computing device 50. The software on program server 35, in response to the indication of the other content to view and the preference of where to send the other content, sending the other content to the selected device.

Figure 3:
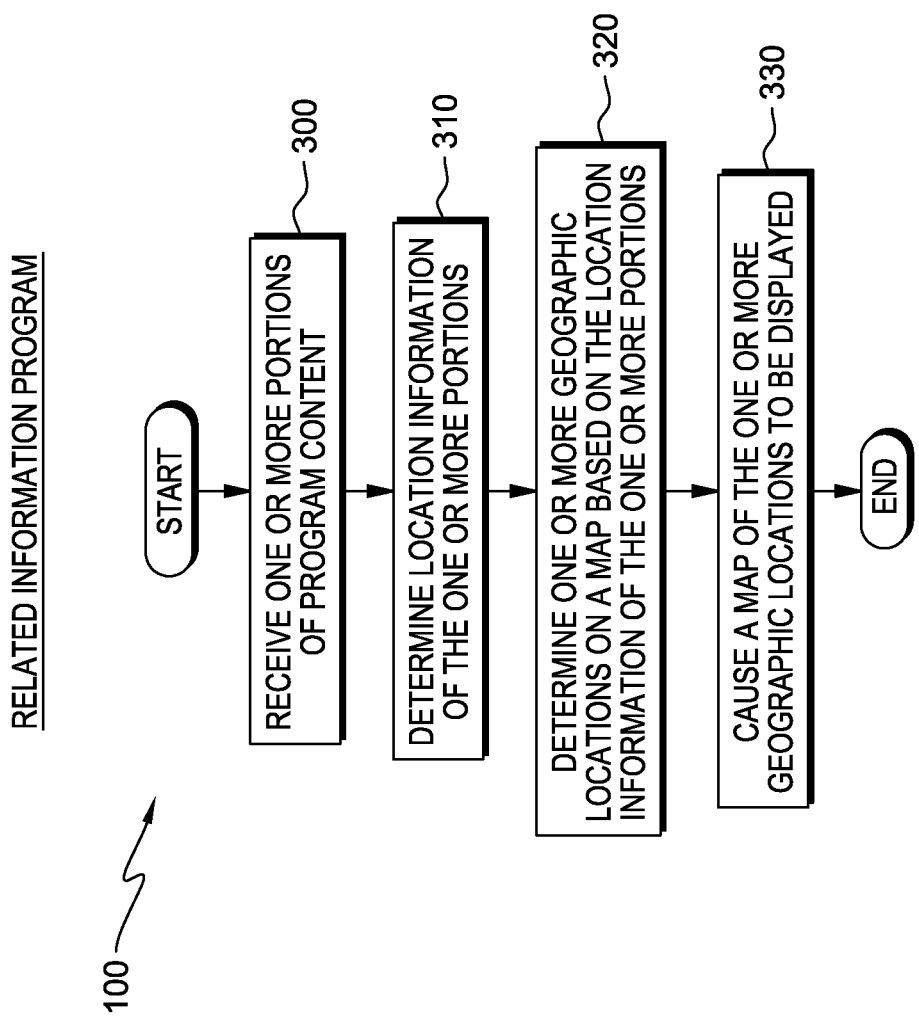
FIG. 3 is a flowchart depicting operational steps of a related information program, executing within the distributed data processing environment of FIG. 1, for determining, during a period when program content is displayed on a viewing device, one or more geographic locations on a map based on location information of the program content, in accordance with another embodiment of the present invention.

FIG. 3 is a flowchart of the steps of related information program 100, operating on viewing device 40, for determining, during a period when program content 70 is displayed on viewing device 40, one or more geographic locations on a map based on the location information for program content 70, in accordance with an alternative embodiment of the present invention. Steps 300 and 310 are the same as steps 200 and 210 described above.

In step 320, related information program 100 determines one or more geographic locations on a map based on the location information of the one or more portions of program content 70. The location information of each portion of the one or more portions of program content 70 corresponds to a geographic location. Depending on how the location information is determined in step 310, related information program 100 may determine the one or more geographic locations on a map in different ways.

In this embodiment, for example, if the location information for each portion of the one or more portions of program content 70 is determined in real-time as each portion is displayed on viewing device 40, related information program 100 determines the geographic location of the portion of the one or more portions of program content 70 currently displayed on viewing device 40. Alternatively, for example, if the location information for all portions of the one or more portions of program content 70 are determined at any time one of the one or more portions of program content 70 is displayed on viewing device 40, related information program 100 determines the one or more geographic locations corresponding to the location information of the one or more portions of program content 70.

In this embodiment, related information program 100 sends the location information for the one or more portions of program content 70 to map program 120 over network 20. Map program 120 returns to related information program 100 a map containing the one or more geographic locations corresponding to the location information of the one or more portions of program content 70. Alternatively, related information program 100 accesses a maps database on viewing device 40 (not shown) to determine the one or more geographic locations corresponding to the location information of the one or more portions of program content 70.

In step 330, related information program 100 causes a map of the one or more geographic locations to be displayed. In this embodiment, related information program 100 sends the map determined in step 320 to mobile computing device 50. For example, the map may be sent to a client program (on mobile computing device 50—not shown) of related information program 100 over network 20 from related information program 100. The client program sends the map to UI 110 to be displayed to a user at mobile computing device 50. Alternatively, related information program 100 sends the map determined in step 320 to viewing device 40. For example, the map may be sent to content processing program 90 from related information program 100. Content processing program 90 displays the map. In various other embodiments, the map may be displayed in a pop-up window, or any other form so as to display the map.

Figure 4:
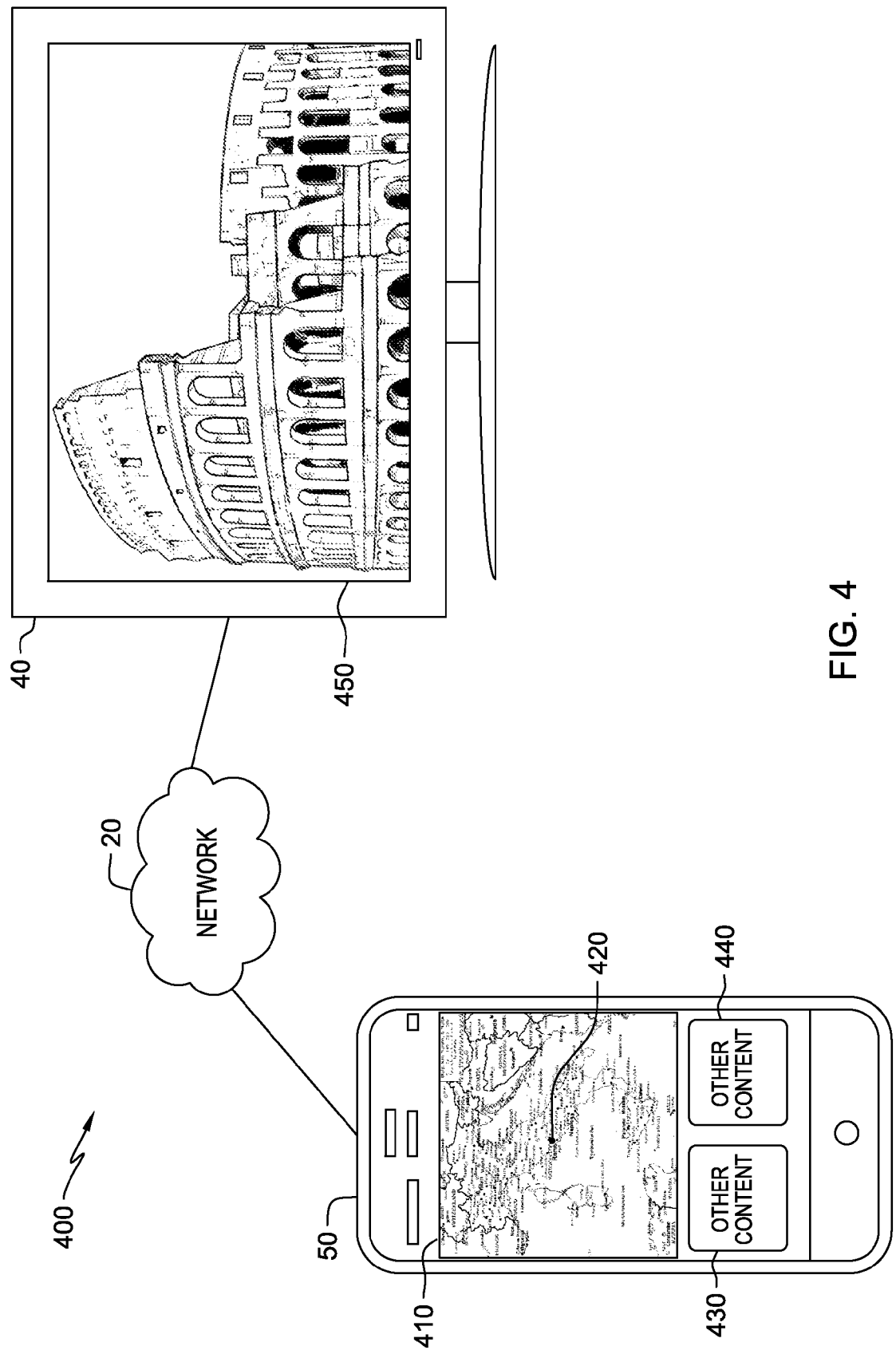
FIG. 4 depicts an exemplary environment in which the viewing device is running related information program, in accordance with one embodiment of the present invention.

FIG. 4 depicts a use case scenario 400 in accordance with one embodiment of the present invention. Scenario 400 depicts program content 450 displayed on viewing device 40. Viewing device 40 is utilizing related information program 100 as discuss above. Scenario 400 also depicts map 410 including geographic location indicator 420, other content 430, and other content 440 displayed on mobile computing device 50.

In scenario 400, viewing device 40 is displaying program content 450 (The Coliseum in Rome, Italy) received over network 20. Program content 450 contains metadata that includes the location information that identifies the geographic location where program content 450 was filmed. In this example, the location information is the name of the city where program content 450 was filmed (Rome, Italy). Related information program 100 determines the location information from the metadata of program content 450 displayed on viewing device 40.

Related information program 100 determines other content available with substantially similar location information as program content 450 (e.g., other content 430 and 440). Related information program 100 causes the determined other content 430 and 440 to be displayed on mobile computing device 50 over network 20. Other content 430 and other content 440 have substantially similar location information as program content 450. For example, other content 430 and other content 440 contain location information as the name of a city (Rome, Italy).

Related information program 100 also determines a geographic location on map 410 based on the location information of program content 450. Related information program 100 causes map 410 to be displayed on mobile computing device 50 over network 20. Map 410 is a map of Italy that is displayed on mobile computing device 50. Geographic location indicator 420 pinpoints an area that encompasses the city of Rome, Italy identified by the metadata of program content 450.

Figure 5:
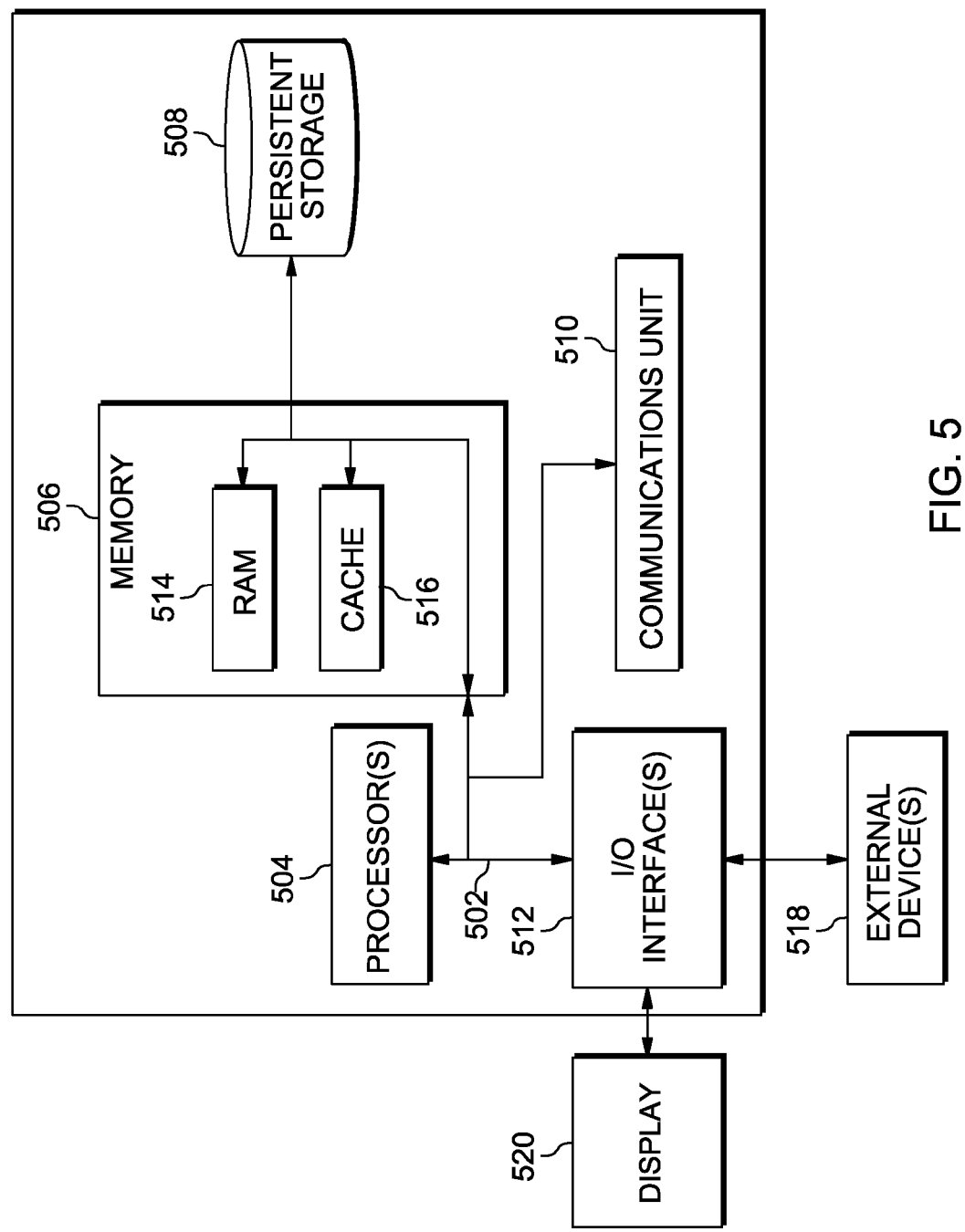
FIG. 5 depicts a block diagram of the components of the program server, viewing device, mobile computing device, and server computer, in accordance with one embodiment of the present invention.

FIG. 5 depicts a block diagram of components of program server 35, viewing device 40, mobile computing device 50, and server computer 60, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Program server 35, viewing device 40, mobile computing device 50, and server computer 60, each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Program content 70 and program database 80 are stored in persistent storage 508 of program server 35 for execution and/or access by one or more of the respective computer processors 504 of program server 35 via one or more memories of memory 506 of program server 35. Content processing program 90 and related information program 100 are stored in persistent storage 508 of viewing device 40 for execution by one or more of the respective computer processors 504 of viewing device 40 via one or more memories of memory 506 of viewing device 40. UI 110 is stored in persistent storage 508 of mobile device 50 for execution by one or more of the respective computer processors 504 of mobile device 50 via one or more memories of memory 506 of mobile device 50. Map program 120 is stored in persistent storage 508 of server computer 60 for execution by one or more of the respective computer processors 504 of server computer 60 via one or more memories of memory 506 of server computer 60. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other servers or devices. In these examples, communications unit 510 includes one or more network interface cards. Communications unit 510 may provide communications through the use of either or both physical and wireless communications links. Program content 70 and program database 80 may be downloaded to persistent storage 508 of program server 35, respectively, through the respective communications unit 510 of program server 35. Content processing program 90 and related information program 100 may be downloaded to persistent storage 508 of viewing device 40, respectively, through the respective communications unit 510 of viewing device 40. UI 110 may be downloaded to persistent storage 508 of mobile computing device 50, respectively, through the respective communications unit 510 of mobile computing device 50. Map program 120 may be downloaded to persistent storage 508 of server computer 60 through communications unit 510 of server computer 60.

I/O interface(s) 512 allows for input and output of data with other devices that may be connected to program server 35, viewing device 40, mobile computing device 50, or server computer 60. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., program content 70 and program database 80, can be stored on such portable computer-readable storage media and can be loaded onto persistent storage 508 of program server 35, respectively, via the respective I/O interface(s) 512 of program server 35. Software and data used to practice embodiments of the present invention, e.g., content processing program 90 and related information program 100, can be stored on such portable computer-readable storage media and can be loaded onto persistent storage 508 of viewing device 40, respectively, via the respective I/O interface(s) 512 of viewing device 40. Software and data used to practice embodiments of the present invention, e.g., UI 110, can be stored on such portable computer-readable storage media and can be loaded onto persistent storage 508 of mobile computing device 50, respectively, via the respective I/O interface(s) 512 of mobile computing device 50. Software and data used to practice embodiments of the present invention, e.g., map program 120, can be stored on such portable computer-readable storage media and can be loaded onto persistent storage 508 of server computer 60 via I/O interface(s) 512 of server computer 60. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining other content related to location information of program content displayed on a device, the method comprising the steps of:
    receiving one or more portions of a first content displayed on a first device, wherein the first content comprises a media broadcast and metadata that contains location information of the one or more portions, wherein the location information identifies a geographic location where the one or more portions were filmed;
    one or more processors determining location information of the one or more portions from the metadata;
    the one or more processors comparing the location information to additional content available from a content provider;
    the one or more processors determining a second content based, at least in part, on the location information and the additional content available from the content provider, wherein the second content comprises a video with at least one portion of the second content having substantially similar location information, indicating where the at least one portion of the second content was filmed, as at least one portion of the one or more portions of the first content;
    the one or more processors generating a list of additional content available from the content provider, wherein the list comprises content available from the content provider, including, at least, the second content, with at least one portion of the content having substantially similar location information, indicating where the content available from the content provider was filmed, as one portion of the one or more portions of the first content;
    causing the list to be displayed;
    receiving a selection of the second content; and
    causing the second content to be displayed.

2. The method of claim 1, wherein the step of causing the second content to be displayed comprises causing the second content to be displayed on the first device.

3. The method of claim 1, wherein the step of causing the second content to be displayed comprises causing the second content to be displayed on a second device.

4. The method of claim 1, further comprising the steps of:
    determining a map identifying a geographic location indicated by the location information of the one or more portions; and
    causing the map identifying the geographic location indicated by the location information of the one or more portions to be displayed.

5. The method of claim 4, wherein the step of causing the map identifying the geographic location indicated by the location information of the one or more portions to be displayed comprises causing the map identifying the geographic location indicated by the location information of the one or more portions to be displayed on the first device.

6. The method of claim 4, wherein the step of causing the map identifying the geographic location indicated by the location information of the one or more portions to be displayed comprises causing the map identifying the geographic location indicated by the location information of the one or more portions to be displayed on a second device.

7. The method of claim 4, further comprising the steps of: the one or more processors causing an indication to be displayed on the map, wherein the indication comprises a location of a restaurant within a specified radius of the location information.

8. The method of claim 1, wherein the location information comprises GPS coordinates.

9. The method of claim 1, further comprising:
the one or more processors searching the Internet for other content with at least a portion having a substantially similar location information, indicating where the other content was filmed, as at least one portion of the one or more portions of the first content; and
wherein the one or more processors generating a list of additional content available from the content provider further comprises adding the other content to the list.

10. The method of claim 1, further comprising:
the one or more processors determining weather information based, at least in part, on the location information; and
causing the weather information to be displayed.

11. The method of claim 1, wherein the content provider is a selected from the group consisting of a cable system provider, a satellite system provider, and an "over the air" television station provider.

12. A computer program product for determining other content related to location information of program content displayed on a device comprising:
one or more computer-readable hardware storage devices and program instructions stored on the one or more computer-readable hardware storage devices, the program instructions comprising:
program instructions to receive one or more portions of a first content displayed on a first device, wherein the first content comprises a media broadcast and metadata that contains location information of the one or more portions, wherein the location information identifies a geographic location where the one or more portions were filmed;
program instructions to determine location information of the one or more portions from the metadata;
program instructions to compare the location information to additional content available from a content provider;
program instructions to determine a second content based, at least in part, on the location information and the additional content available from the content provider, wherein the second content comprises a video with at least one portion of the second content having substantially similar location information, indicating where the at least one portion of the second content was filmed, as at least one portion of the one or more portions of the first content;
program instructions to generate a list of additional content available from the content provider, wherein the list comprises content available from the content provider, including, at least, the second content, with at least one portion of the content having substantially similar location information, indicating where the content available from the content provider was filmed, as one portion of the one or more portions of the first content;
program instructions to cause the list to be displayed;
program instructions to receive a selection of the second content; and
program instructions to cause the second content to be displayed.

13. The computer program product of claim 12, wherein the program instructions to cause the second content to be displayed comprise program instructions to cause the second content to be displayed on the first device.

14. The computer program product of claim 12, wherein the program instructions to cause the second content to be displayed comprise program instructions to cause the second content to be displayed on a second device.

15. The computer program product of claim 12, further comprising:
program instructions, stored on the one or more computer-readable hardware storage devices, to determine a map identifying a geographic location indicated by the location information of the one or more portions; and
program instructions, stored on the one or more computer-readable hardware storage devices, to cause the map identifying the geographic location indicated by the location information of the one or more portions to be displayed.

16. The computer program product of claim 15, wherein the program instructions to cause the map identifying the geographic location indicated by the location information of the one or more portions to be displayed comprise program instructions to cause the map identifying the geographic location indicated by the location information of the one or more portions to be displayed on the first device.

17. The computer program product of claim 15, wherein the program instructions to cause the map identifying the geographic location indicated by the location information of the one or more portions to be displayed comprise program instructions to cause the map identifying the geographic location indicated by the location information of the one or more portions to be displayed on a second device.

18. A computer system for determining other content related to location information of program content displayed on a device, the computer system comprising:
one or more computer processors;
one or more computer-readable hardware storage devices;
program instructions stored on the computer-readable hardware storage devices for execution by at least one of the one or more processors, the program instructions comprising:
program instructions to receive one or more portions of a first content displayed on a first device, wherein the first content comprises a media broadcast and metadata that contains location information of the one or more portions, wherein the location information identifies a geographic location where the one or more portions were filmed;
program instructions to determine location information of the one or more portions from the metadata;
program instructions to compare the location information to additional content available from a content provider;
program instructions to determine a second content based, at least in part, on the location information and the additional content available from the content provider, wherein the second content comprises a video with at least one portion of the second content having substantially similar location information, indicating where the at least one portion of the second content was filmed, as at least one portion of the one or more portions of the first content;
program instructions to generate a list of additional content available from the content provider, wherein the list comprises content available from the content provider, including, at least, the second content, with at least one portion of the content having substantially similar location information, indicating where the content available from the content provider was filmed, as one portion of the one or more portions of the first content;

program instructions to cause the list to be displayed;

program instructions to receive a selection of the second content; and program instructions to cause the second content to be displayed.

19. The computer system of claim 18, wherein the program instructions to cause the second content to be displayed comprise program instructions to cause the second content to be displayed on the first device.

20. The computer system of claim 18, wherein the program instructions to cause the second content to be displayed comprise program instructions to cause the second content to be displayed on a second device.

* * * * *